Patented Sept. 12, 1922.

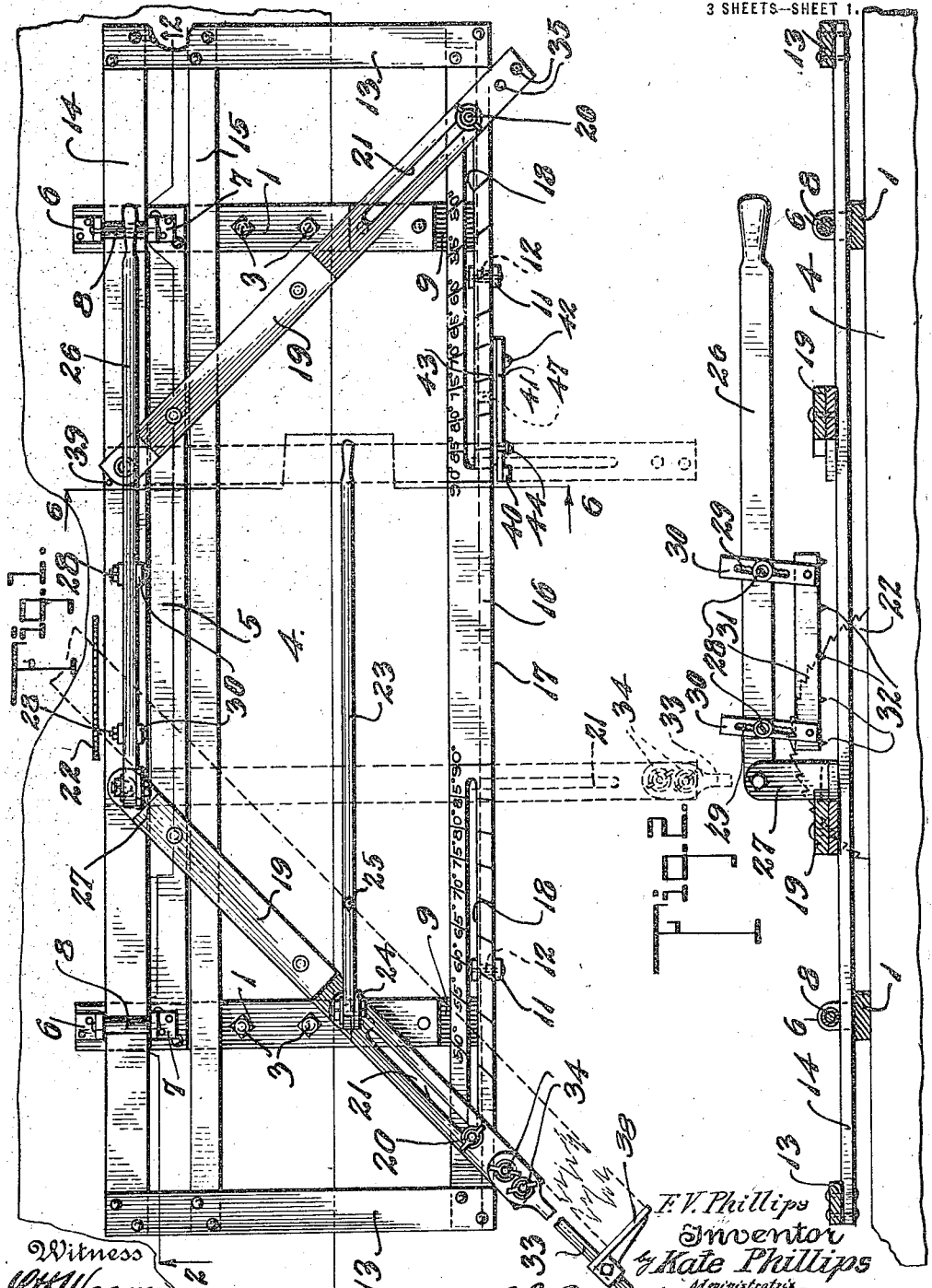

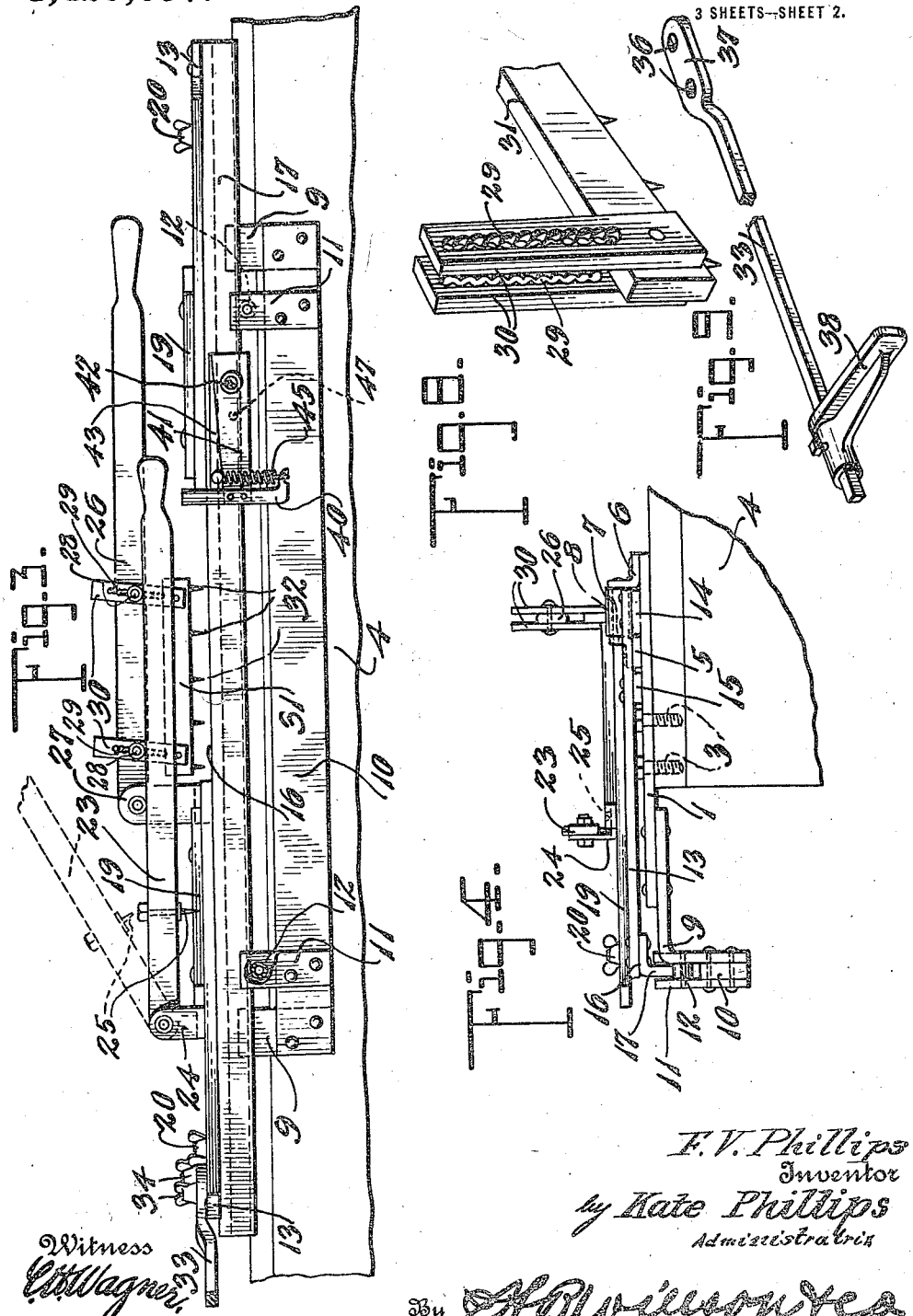

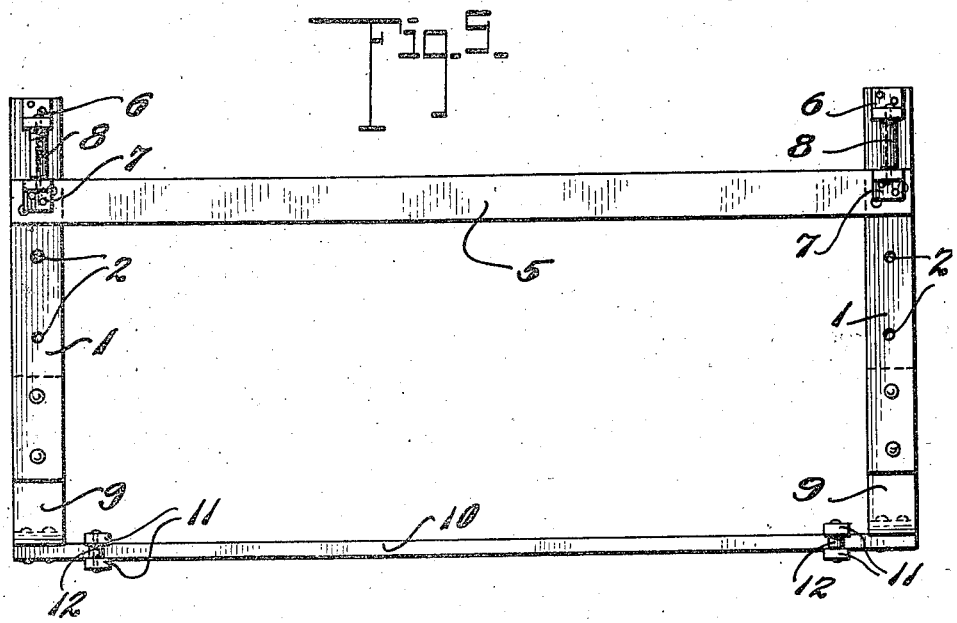
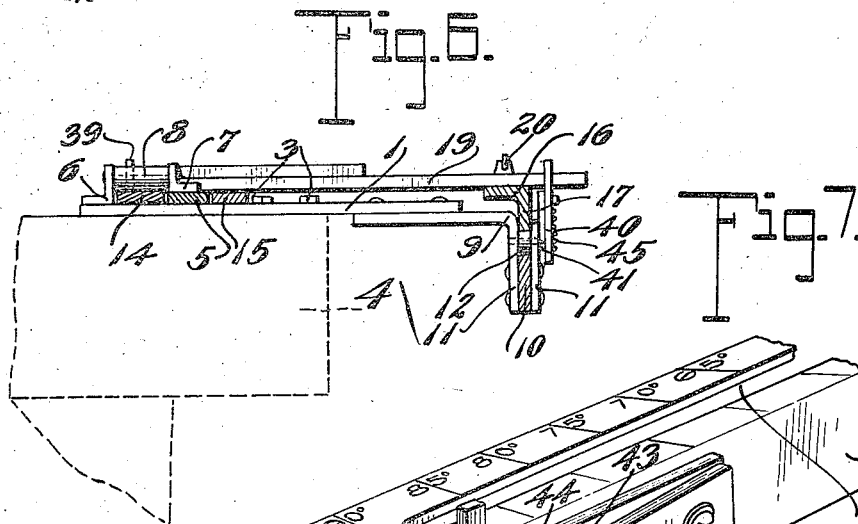
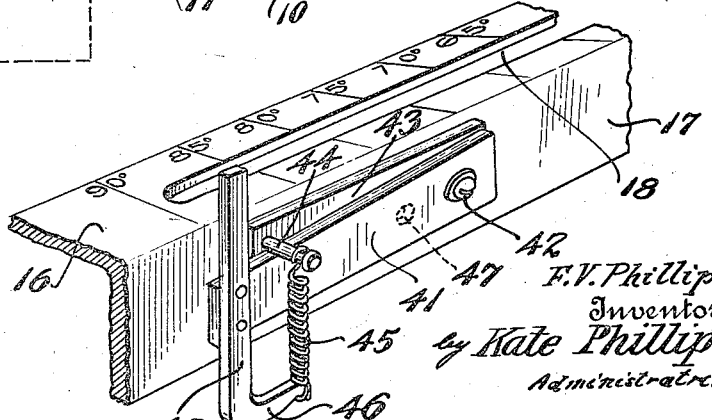

1,429,097

UNITED STATES PATENT OFFICE.

FRANCIS V. PHILLIPS, DECEASED, BY KATE PHILLIPS, ADMINISTRATRIX, OF ORLANDO, FLORIDA.

DADO AND MITER ATTACHMENT FOR SAW TABLES.

Application filed May 12, 1921. Serial No 468,899.

*To all whom it may concern:*

Be it known that, FRANCIS V. PHILLIPS, deceased, late a citizen of the United States, has invented certain new and useful Improvements in Dado and Miter Attachments for Saw Tables; and that I, KATE PHILLIPS, the duly-constituted administratrix of the estate of Francis V. Phillips, deceased, do hereby declare the following to be a full, clear, and exact description of the said invention of said decedent, such as will enable others skilled in the art to which it appertains to make and use the same.

This invention relates to an improved dado and mitering attachment for a saw table and one object of the invention is to provide a device so constructed that it may be releasably mounted upon the saw table, the attachment including a base member or frame adapted for connection with the saw table and a slide frame slidably carried by the base frame and carrying gauging means against which a board to be cut will be placed and secured by attaching means carried by the gauging means.

Another object of the invention is to provide a dado and mitering attachment for a saw table in which the sliding frame may be easily moved and may be guided in its sliding movement.

Another object of the invention is to so construct this dado and mitering attachment that the board may be easily cut at the desired angle and further to so construct the device that an auxiliary gauge may be provided so that the board may be cut the proper length.

Another object of the invention is to provide a dado and mitering attachment which will be simple in construction and easy to operate.

Another object of the invention is to provide an improved type of clamping device for holding a board flat upon the sliding frame with its edge in engagement with the gauge bar.

Another object of the invention is to provide an improved type of abutment movably carried by the sliding frame for engaging the edge of a board extended across the sliding frame at right angles to the same when it is desired to provide a straight cut end for the board, the abutment being so mounted that it may be moved down out of the way and secured in the inoperative position when it is desired to cut the end of the board at an incline.

This invention is illustrated in the accompanying drawings, wherein:

Figure 1 is a top plan view of the improved mitering attachment.

Figure 2 is a longitudinal sectional view taken along the line 2—2 of Fig. 1.

Figure 3 is a view showing the mitering attachment in side elevation.

Figure 4 is a view showing the device in end elevation.

Figure 5 is a top plan view of the table-engaging frame.

Figure 6 is a transverse sectional view taken along the line 6—6 of Fig. 1.

Figure 7 is a fragmentary perspective view showing the mounting of the abutment for engaging a board to be cut off at right angles.

Figure 8 is a fragmentary perspective view showing a portion of a clamping element.

Figure 9 is a perspective view of the auxiliary gauge used for gauging the length of a board.

This improved dado and mitering attachment for a saw table is provided with a table-engaging frame shown in Fig. 5. This table-engaging frame may be termed a base frame or base member and is provided with end bars 1 having openings 2 formed therein to receive securing bolts or screws 3 by means of which the base frame will be releasably secured to the table 4. These end bars 1 are connected by a cross bar 5 which extends longitudinally of the frame. Bearings 6 and 7 are carried by the end bars and cross bar and serve to rotatably mount the rollers 8 which extend longitudinally of the end bars. Short bars or arms 9 are secured to the underfaces of the end bars 1 and have their end portions bent down and secured to the ends of the connecting bar 10. This connecting bar 10 carries upstanding bearing strips 11 between which will be mounted rollers 12. From an inspection of Figs. 4 and 6, it will be seen that this base frame will rest flat upon the table and one portion thereof will extend beyond the side of the table.

The sliding frame is provided with end bars 13 which are connected by longitudinally extending bars 14, 15 and 16, which are secured to the underfaces of the end bars.

The bars 14 and 15 are formed of flat strips which are positioned in spaced relation so that the bar 5 may be positioned between these bars when the sliding frame is resting upon the base frame with the bar 14 positioned beneath the rollers 8. The bar 16 is formed of angle iron having a depending side portion 17 which extends downwardly as shown in Figs. 4 and 6 and has its lower edge extending between the bearing strips 11 and resting upon the rollers 12. Slots 18 are formed in the bar 16 and scale markings are provided as shown in Figs. 1 and 7, so that the gauge bars 19 which are pivotally connected with the bar 14 may be swung to extend at a desired angle and be secured in a set position by securing bolts 20 which extend through the slots 18 and through the slots 21 of the gauge bars 19. If it is desired to cut a board at a desired angle, the board will be placed across the sliding frame with its edge engaging one of the gauge bars 19 which has been moved to the proper position with respect to its co-operating scale and secured and the sliding frame can then be moved longitudinally so that the board will be brought into engagement with the saw blade 22 and thus cut off. In order to provide means for clamping the board upon the sliding frame and in engagement with the gauge bar, one or both of the gauge bars may be provided with clamps as shown. In the drawings, only one of these gauge bars has been shown provided with the clamps but it is to be understood that each may be provided with the clamps if so desired. One of these clamps is in the form of a pivotally mounted bar or lever 23 which is pivotally connected with a bearing bracket 24 rotatably connected with the gauge bar adjacent the slot 21. By having this bearing bracket rotatably mounted, the gauge bar may be set at the desired angle and the clamping bar or lever then brought into a position in which it can be conveniently swung down to cause the penetrating prong or tooth 25 to bite into the board. The second clamping device is also provided with a pivoted bar or lever 26 which is pivotally mounted by means of a bearing bracket 27 rotatably connected with the gauge bar at its pivoted end and preferably mounted by the same fastener which pivotally mounts the gauge bar. This clamping lever is provided with openings through which will pass securing bolts 28 which pass through the slots 29 carried by the suspending arm 30 of the toothed bar 31. The toothed bar 31 is pivotally connected with the hanger bars 30 so that when the clamp is in use, the lever may be swung downwardly and the toothed bar brought into a position substantially parallel to the upper face of the board with the teeth 32 biting into the board.

When this device is in use, the board which is to be cut will be placed flat across the sliding frame and extended so that when the sliding frame is moved, the saw will cut through the end of the board and thus cut the end of the board at the desired angle. This board may be simply held in engagement with a gauge bar or it may be clamped tightly in position by means of the clamps shown and previously described. If it is desired to have a board cut off at a desired length, a length gauging rod 33 may be connected with the gauge bar which is to be used by means of securing bolts 34 which will pass through openings 35 in the end of the gauge bar and through openings 36 in the head 37 of this length gauging rod. A shoe 38 which forms an abutment for engaging the end of the board is slidably mounted upon this rod 33 and is provided with a set-screw so that it can be releasably secured in a set position upon the rod. It will thus be seen that with the abutment secured at the desired position, the board may be brought into engagement with the gauge bar with one end engaging the abutment and the board will then be cut off at the desired angle and will be of a proper length. In order to permit a board to be cut off at right angles without it being necessary to set the gauge bars, there has been provided an abutment pin 39 which extends upwardly from the longitudinally extending bar 14 of the sliding frame and an abutment bar 40 which is secured to a lock 41 pivotally mounted by means of a bolt or other fastener 42 which passes through a strip 43 carried by the depending side flange of the bar 16. A pin 44 extends from this strip 43 and carries a spring 45 which engages the bent end portion 46 of the abutment arm or bar 40. When the board is to be cut off at right angles, it will be brought into engagement with the abutment pin 39 and abutment arm 40 but when it is desired to cut the end of the board at a slight angle which would bring the gauge bar into such a position that the gauge bar is positioned close to the upstanding end portion of the arm 40, the board will rest upon the upper end of this arm and the arm will be forced down out of the way. When it is no longer desired to use the mitering attachment, the securing bolts 3 can be easily removed and the device can be taken off of the saw table. It will thus be seen that the device will be very convenient for use in connection with a sawing table and that the device will be particularly useful in sawing boards where it is desired to have the boards all cut off at the same angle or notches formed in a board with the notches all cut at the same angle as would be required in the step receiving notches commonly provided in the risers of a stairway. In the illustration, the attachment has been shown in use applied to a saw table in which a circular saw blade is carried by the shaft. If it is desired to employ the saw table attachment as a dado machine, it is only necessary to remove the saw blade and place a dado head upon the saw shaft.

I claim:

1. A dado and miter attachment for a saw table comprising a base frame having end bars, longitudinally extending bars connecting said end bars, rollers rotatably mounted above said end bars, a sliding carriage having end bars and longitudinally extending bars connecting its end bars, with one of the longitudinally extending bars of the sliding frame extending beneath the rollers of the base frame and one of the longitudinally extending bars of the base frame positioned between certain of the longitudinally extending bars of the sliding frame, roller elements carried by one of the longitudinally extending bars of the base frame and engaging one of the longitudinally extending bars of the sliding frame, gauging elements adjustably connected with the sliding frame, and clamping means for holding a board upon the sliding frame and in engagement with the gauging elements.

2. A dado and miter attachment for a saw table comprising a base frame having end bars, a longitudinally extending bar connecting said end bars adjacent one side of said frame, rollers mounted adjacent the ends of the longitudinally extending bar, the opposite end portions of the end bars being extended downwardly, a longitudinally extending bar connected with the downturned end portions of the end bars, rollers mounted above the last mentioned bar, a sliding frame having end bars and longitudinally extending bars positioned upon opposite sides of the first mentioned longitudinally extending bar of the base frame with one of the longitudinally extending bars of the sliding frame positioned beneath the first mentioned rollers, a longitudinally extending bar connected with the end bars of the sliding frame and provided with a depending side portion resting upon the second mentioned rollers, and gauging means adjustably connected with the sliding frame.

3. A dado and miter attachment for a saw table comprising a base frame including cross bars and longitudinally extending bars, rollers carried by the base frame, a sliding frame including longitudinally extending bars with one of the bars resting upon certain of the rollers of the base frame and other longitudinally extending bars extending upon opposite sides of one of the longitudinally extending bars of the base frame, one of the last mentioned bars of the sliding frame extending beneath other rollers of the base frame, gauge bars pivotally connected with one of the last mentioned bars of the sliding frame and extending in co-operative relation to scale markings provided upon the sliding frame, means for releasably holding the gauge bars in a set position.

4. A dado and miter attachment for a saw table comprising a base member, a sliding member slidably connected with the base member, a gauge bar pivotally connected with the sliding member for swinging movement in a horizontal plane and clamping means carried by the gauge bar for swinging movement in a horizontal plane above the sliding member and swinging movement in a vertical plane into and out of position for releasably holding a board upon the sliding member in operative relation to the gauge member.

5. A dado and miter attachment for a saw table comprising a base member, a sliding member slidably connected with the base member, a gauge bar pivotally connected with the sliding member and releasably held in a set position, a bearing bracket rotatably connected with the gauge bar and having its pivot parallel with the pivot of the gauge bar, and a clamping lever pivotally connected with the bearing bracket and having swinging movement above the table in a horizontal plane and movable towards and away from the table in a vertical plane.

6. The structure of claim 5, and a board engaging element carried by the lever and having a tooth carrying bar, hanger strips pivotally connected with the tooth carrying bar and provided with longitudinally extending slots, and fasteners carried by the lever bar and passing through the slots of the hangers.

7. A dado and miter attachment for a saw table comprising a base frame, a sliding frame slidably connected with the base frame, a gauge bar pivotally connected with the sliding frame and releasably held in a set position, an abutment pin carried by the sliding frame adjacent the pivoted end of the gauge bar, a support pivotally connected with the sliding frame at the opposite side thereof from said abutment pin, an abutment arm carried by said pivoted support, and resilient means normally holding said support in a raised position with the abutment arm carried thereby extended above the sliding frame for engagement by a board extending transversely of the sliding frame at substantially right angles thereto and having engagement with the abutment pin.

In testimony whereof I have hereunto set my hand.

KATE PHILLIPS.
*Administratrix of Francis V. Phillips, deceased.*